W. G. TEN BROECK AND W. PRESTON.
TRACTOR HITCH.
APPLICATION FILED MAR. 22, 1919.
1,318,819.
Patented Oct. 14, 1919.
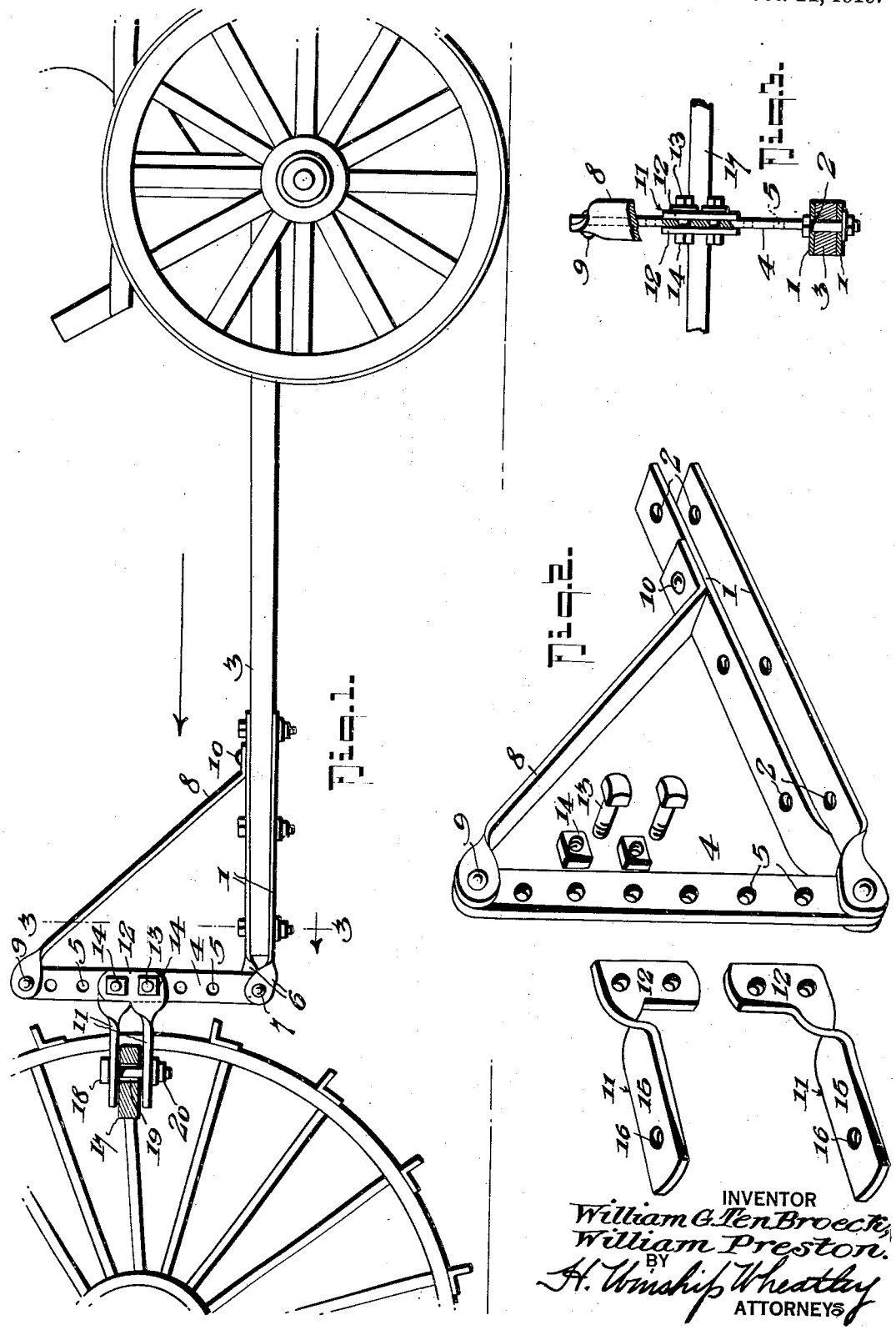
INVENTOR
William G. Ten Broeck,
William Preston.
BY
H. Winship Wheatley
ATTORNEYS

UNITED STATES PATENT OFFICE.

WILLIAM G. TEN BROECK AND WILLIAM PRESTON, OF CHESTER, NEBRASKA.

TRACTOR-HITCH.

1,318,819.   Specification of Letters Patent.   Patented Oct. 14, 1919.

Application filed March 22, 1919. Serial No. 284,340.

*To all whom it may concern:*

Be it known that we, WILLIAM G. TEN BROECK and WILLIAM PRESTON, citizens of the United States, residing at Chester, in the county of Thayer and State of Nebraska, have invented an Improved Tractor-Hitch, of which the following is a specification.

Our invention has reference to that class of devices or appliances for coupling tractors or other draft vehicles with other vehicles or objects to be pulled or dragged along with the tractor or draft vehicle and our said invention primarily seeks to provide an improved device of the character stated, of a simple and economical construction and which is especially designed for hitching a tractor onto anything to be pulled or moved.

Another object of our invention is to provide an improved coupling device for hitching a tractor to a vehicle, a drag or other object to be pulled along, which includes simple and easily adjustable means for readily coupling the tractor to farm wagons, drags or other portable machinery to their tongues or beams disposed at different heights from the ground.

With other objects in view that will hereinafter be apparent, our invention is an improved tractor hitch that embodies the peculiar features of construction and novel combination of parts to be first explained in detail and then specifically pointed out in the appended claims, reference being had to the accompanying drawings, in which:

Figure 1 is a side elevation of our improved tractor hitch, so much of a tractor and a wagon being shown as is necessary to illustrate a practical application of our improvement.

Fig. 2 is a perspective view of the hitch, the adjustable clip or connecting members and the connection bolts therefor being shown separated from the hitch frame or bracket.

Fig. 3 is a transverse section of our invention taken on the line 3—3 on Fig. 1, looking in the direction of the arrow.

In carrying out our invention, the hitch is formed of a series of heavy strap irons including a pair of opposing parallel members 1—1, that are suitably apertured as at 2—2 to provide for easily bolting the said irons 1—1 to the upper and lower faces of the tongue or draft beam 3 of a wagon or other object to be pulled.

4 designates a draft iron that is also apertured as at 5—5. The lower end of the iron is clamped between a pair of ears 6—6 which are formed by turning the outer ends of the members 1—1 inwardly, at right angles, the said ears and the said lower end of the iron 4 being secured by a rivet bolt 7, as is clearly shown on Figs. 1 and 2.

The draft iron 4 is held in vertical position, with respect to the members 1—1, by a brace iron 8, whose upper end is bent at right angles to the body and is secured to the upper end of the iron 4 by a rivet bolt 9. The brace member 8 extends diagonally down to the upper one of the members 1, its lower end being angled to form a foot which is secured to the said member 1 by a rivet 10.

11—11 designate a pair of clip-like connectors, each formed of heavy strap metal and each including an apertured head 12 adapted for being clamped, at the desired adjustments, along the opposite sides of the draft iron 4, by clamp bolts 13 and nuts 14, see Figs. 1 and 3.

The body portions 15 of the connectors 11 are bent at right angles to their head portions 12 and each of the said body portions has one, or more, if desired, apertures 16.

From the foregoing description taken in connection with the accompanying drawings, the complete construction, the manner of using and the advantages of our invention will be readily apparent.

When utilized for pulling a wheeled vehicle, as shown in Fig. 1, the head portion 12 of the clip connections are first adjusted along and secured to the draft iron 4, to suit the height of the tongue of the vehicle with respect to a connector bar 17 that constitutes a part of the tractor, a portion of the body of which is indicated as coming within the confines of the dotted lines on Fig. 1, it being understood, by reference to the said figure, the members 15 straddle the bar 17 and are secured by a pivot bolt 18 that passes through an aperture 19 in the said bar 17 and the nut 20 that engages the bolt 18, as shown.

Our invention is exceedingly simple and can be readily made in rural districts by an ordinary blacksmith and can be easily applied for use by any one familiar with the handling of tractors or other draft vehicles for farm uses.

What we claim is:

1. A hitch device for the purposes described, comprising a draft iron, a pair of parallelly disposed strap irons having alining apertures to facilitate clamping said strap irons onto the opposite faces of a pull tongue, the outer ends of said strap irons being riveted to one end of the draft iron, an angled bracket connected to the free end of the draft iron and to one of the aforesaid strap irons, and means for connecting the draft iron with a tractor or other draft vehicle.

2. A hitch device for the purposes described, comprising a draft iron, a pair of parallelly disposed strap irons having alining apertures to facilitate clamping said strap irons onto the opposite faces of a pull tongue, the outer ends of said strap irons being riveted to one end of the draft iron, an angled bracket connected to the free end of the draft iron and to one of the aforesaid strap irons, and means for connecting the draft iron with a tractor or other draft vehicle, the said draft iron having a series of longitudinally alined apertures, the said connecting means consisting of a pair of links, each having an apertured head portion, means for adjustably connecting the said head portions along the draft iron, the said connecting links including flat body portions twisted in a plane at right angles to the head portion, each of the body portions having an aperture, the said apertured body portions being adapted for straddling onto a member that forms a part of a tractor or other draft vehicle and a bolt and nut that engages the apertured body portion of the connecting clips to the aforesaid tractor part and constitute a pivotal connection between the said tractor part and the hitch device.

WILLIAM G. TEN BROECK.
WILLIAM PRESTON.